Feb. 13, 1940.    M. L. ECKMAN    2,189,784
WELDING DEVICE
Filed March 5, 1938    2 Sheets-Sheet 1
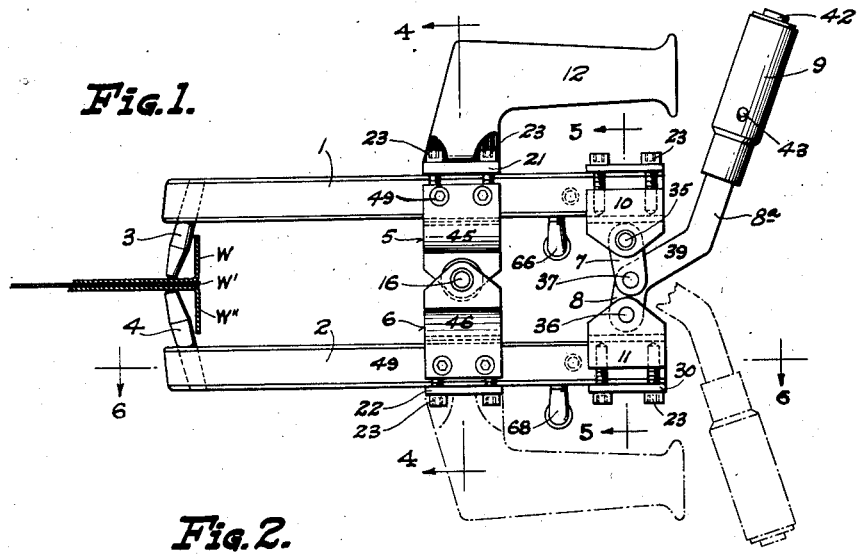
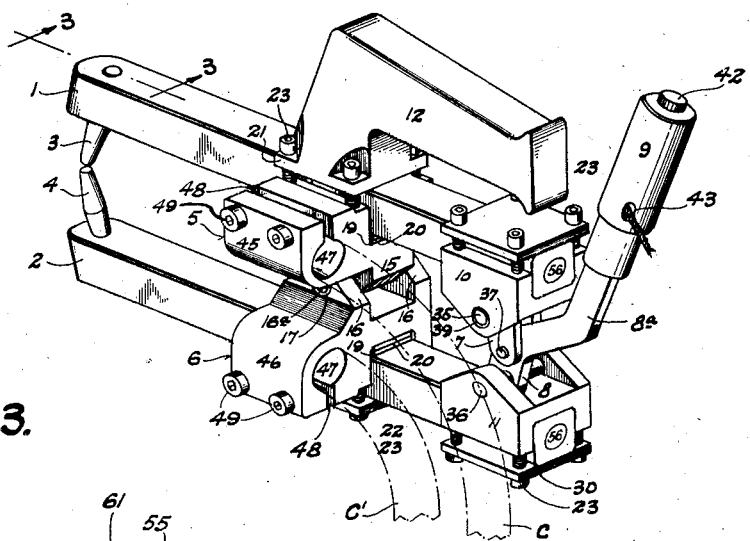
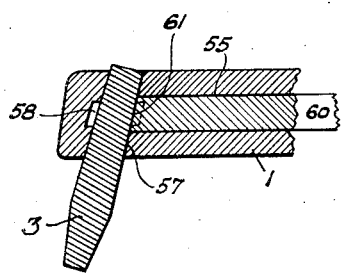
INVENTOR.
MERIL L. ECKMAN
BY Bates, Golrick & Teare
ATTORNEYS.

Feb. 13, 1940.  M. L. ECKMAN  2,189,784
WELDING DEVICE
Filed March 5, 1938   2 Sheets-Sheet 2
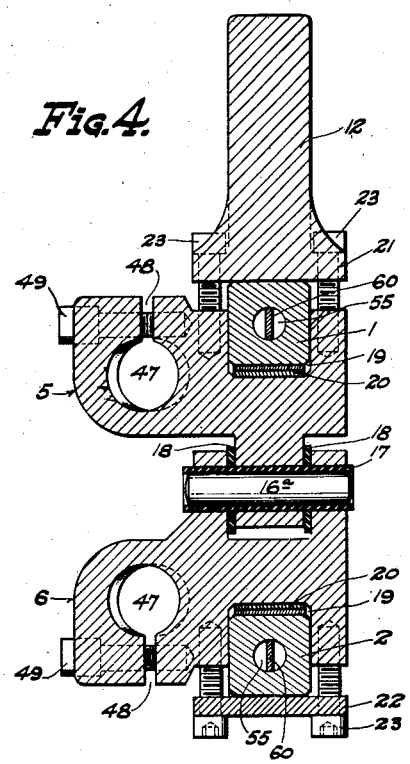
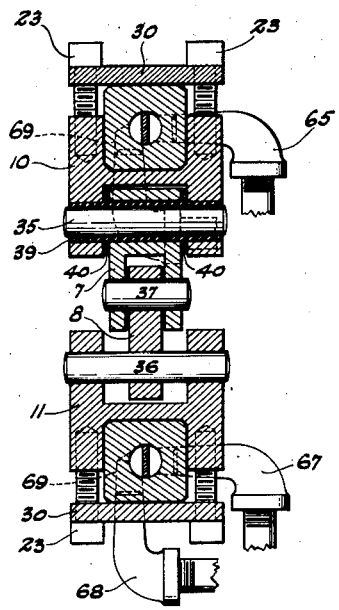
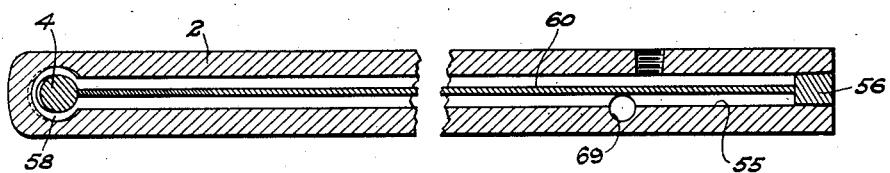
INVENTOR.
MERIL L. ECKMAN
BY Bates, Gobrick & Teare
ATTORNEYS.

Patented Feb. 13, 1940

2,189,784

UNITED STATES PATENT OFFICE 2,189,784

WELDING DEVICE

Meril L. Eckman, Cleveland, Ohio, assignor to American Coach & Body Company, Cleveland, Ohio, a corporation of Ohio Application March 5, 1938, Serial No. 194,126

11 Claims. (Cl. 219—4)

This invention relates to electric welding machines, and more specifically to a portable spot-welder, that is to say a unitary welding mechanism which an operator can lift, and by which he can apply a pair or set of electrodes to the work and effect a spot-welding operation.

The objects include the provision of an improved welding machine, having one or more of the following features: An arrangement for altering electrode pressure on the work independently of the force exerted by the operator's hand or hands; simple and effective means for changing the relative movement of the electrodes toward the work, so as to compensate for wearing or burning off of the electrodes; simple and effective provision for changing the position of one or more hand-hold members with respect to the welding unit; and, more specifically, provision for changing the relative positions of fixed and movable hand-hold members, one of which is an operating lever for a pressure applying mechanism.

The objects further include the provision of an improved cooling system for welding electrodes and supporting members therefor.

Other objects of the invention will become apparent from the following description relating to the accompanying drawings which show the preferred form. The essential characteristics are summarized in the claims.

The portable spot-welding mechanism shown is of the tongs type, also commonly referred to as a "gun". The electrodes are mechanically connected together in such manner that they can be forced against the work and separated; and the connecting mechanism includes force increasing means—a toggle, as shown—for obtaining the desired welding pressure manually.

It is frequently desirable that a supporting handle or operating lever or both occupy one relative position or position relative to the unit when doing work of one kind, but different positions when performing work of another kind. The present arrangement permits quick changing of position of such hand-hold and lever members and securely fastening them in changed operating positions.

It is also frequently desirable to change the pressure of the electrodes on the work incident to a predetermined exertion of manual force. The present arrangement permits the force applied by the operator to be effectively increased as much as could be desired for spot-welding purposes, but without complex adjustment means.

Prior portable spot-welders of the gun or tongs type, so far as I know, do not have any simple and reliable provision for altering the movement of the electrodes so as to compensate for shortening of the same, due, for example, to fusion of the electrode metal. In the present arrangement, such compensation may be easily effected a number of times, securing long life of the electrodes and without producing faulty electrical connections.

Other features and advantages including those of the improved cooling system will be hereinafter explained in detail.

Referring to the drawings, Fig. 1 is a side elevation showing the mechanism in one form; Fig. 2 is a perspective view from the rear thereof; Fig. 3 is a fragmentary sectional detail view as indicated by the line 3—3 on Fig. 2; Figs. 4 and 5 are transverse sectional views as indicated by the lines 4—4 and 5—5 on Fig. 1; and Fig. 6 is a longitudinal sectional view, through one of the electrodes and a supporting bar therefor taken on a plane indicated by the line 6—6 on Fig. 1, the supporting members for the bar being omitted.

Referring further to the drawings, the framework of the machine includes two electrically conductive bars, shown as upper and lower members I and 2. These are non-circular, being preferably square in cross-section, made for example of copper. The bars have electrodes 3 and 4 projecting laterally therefrom in positions to contact simultaneously with opposite regions of the work to weld it. As shown in Fig. 1, sheet-metal members W, W' and W'' are being spot-welded together.

Intermediately of their ends, the bars I and 2 are secured together for operation in the manner of a pair of tongs by pivotally interconnected bracket members 5 and 6, and such operation is accomplished manually by a lever mechanism including toggle links 7 and 8, one of which has an extension operable as a lever. The link 8 as shown, is extended as at 8a to support a handle 9. The links are secured to respective brackets 10 and 11 clamped to the shank portions of the bars.

The operation of steadying and guiding of the machine is acomplished in part by the operator's grasp on a handle member 12 attached, as will later be described, to one of the brackets 5 and 6.

As shown in Figs. 1 and 4, the brackets 5 and 6 are of similar construction and the illustrated pivot connection between them comprises a central ear formation 15 on the bracket 5 and a pair of ears 16 (on 6) which embrace the ear 15, and are connected to it by a pin 16a. The pin passes through an electrically insulative bushing 17 (e. g., material such as Bakelite), which is received by suitable aligned holes in the ears of the bracket. The ears of the two brackets are further insulated from each other by washers 18 of insulating material such as that of the sleeve.

For varying the effective force that may be applied by the operator to the work through the toggle-lever mechanism, the brackets 5 and 6 are adjustably mounted on the conductor bars 1 and 2. As shown, the opposed sides of the two brackets are notched, as at 19, so as closely to embrace the sides of the respective bars. The "bottoms" of the notches may be spaced from the bars by shims 20, which may be selectively removed or shifted from one notch to the other to compensate for wear of the electrodes. Alteration of the mechanical advantage at which the toggle mechanism operates may be effected by moving the brackets as a unit closer to or farther away from the electrodes; a greater advantage resulting from the former movement.

The bars 1 and 2 may be clamped in position in the notches 19 by square plates 21 and 22, each as shown being secured by equally spaced capscrews 23 which enter threaded holes in respective top and bottom faces of the brackets 5 and 6. The plates are interchangeable on the two brackets. The handle member 12 is preferably integral with the plate 21 and has an appropriate hand-hold portion which in the position shown extends generally parallel to the bar 1.

With reference to Figs. 1 and 4, it will be seen that the handle may be applied in several ways to either bracket 5 or 6, or the handle may extend laterally by turning the plate 21 at right angles to its full-line-illustrated position, either to the right or left. It may, therefore, be secured to either bracket 5 or 6 in any of four possible positions on each, as will be obvious from the above description. Fig. 1 illustrates in broken lines one such alternate position of the handle on the bracket 6.

The illustrated toggle mechanism for operating the conductor bars to move the electrodes with relation to each other connects the rearward or shank portions of the two bars 1 and 2. The mechanism may include brackets 10 and 11, which are notched to receive the bars in a manner similar to the notching described with respect to the brackets 5 and 6. Plates 30 which may be identical in construction with the plate 22, and have a similar arrangement of screws 23, may be used to clamp the brackets 10 and 11 tightly onto the shanks of the bars. Space is also provided for shimming the brackets to bring them toward each other, or space them further apart, which shims (not illustrated) could occupy the effective bottom portions of the notches and lie flat-wise against the bars 1 and 2, in a manner already described.

The toggle link 7 is preferably bifurcated, and its upper end may be secured, as by a cross-pin 35, to the bracket 10. The other link 8, as shown, is pivoted on a cross-pin 36 in the bracket 11; and, as previously mentioned, extends beyond the toggle pivot pin 37 to support the handle 9 and forms an operating lever for the toggle mechanism. The extension 8a of the link 8 may be bent so that the handle is in convenient position for operation.

It will be seen that thrusting of the handle 9 downwardly from the position shown in Fig. 1 will operate, through the toggle linkage, to move the shank ends of the conductor bars together, thereby spreading the electrodes apart; and that opposite movement of the handle will move the electrodes toward each other to effect the desired electrode pressure on the work. The handle may be reversed in position, as indicated in broken lines in Fig. 1, by connecting the link 8 to the pin 35, and the link 7 to the pin 36.

Suitable insulation means for the bars 1 and 2 at the toggle mechanism may comprise an infusible thermal-setting resin or other composition sleeve 39 surrounding the pin 35; and, in addition, the link 7 may be spaced from the supporting ears of the bracket 10 by insulating washers 40.

A convenient location for a control switch button 42 is on the end of the handle 9. Conductor wires leading, for example, from a main control switch (not shown) may enter the handle at a side opening 43 and lead to the switch which is inside the handle and operated by the button.

Current supply cables C and C', shown in broken lines, may be connected to respective conductor bars at hollow clamp extensions 45 and 46 of the brackets 5 and 6. The extensions may have cylindrical openings 47 extending through them, and at a slight angle to the working plane of the bars 1 and 2. The extensions may also be slotted, as at 48, to allow the cable ends to be clamped as by screws 49.

A very simple and effective manner of cooling the electrodes 3 and 4 and their conductor bars is shown in Figs. 3 to 6, wherein it will be noted that both bars 1 and 2 are longitudinally bored from the shank ends as at 55, the bores extending to the respective electrodes. The rear ends of the bores may be plugged as at 56. The electrodes 3 and 4, as shown, are generally cylindrical in form (shown slightly tapered in opposite directions) and secured in cross-bores 57 (see Fig. 3), as by press-fit, brazing or other appropriate means. Circular recesses 58 lead from each side of each bore 55, entirely around the respective electrodes to the other side. The bores 55 are divided by partition strips 60, extending for substantially the entire length of the bores and the strips have their outer ends bias-cut as at 61 (in case the electrodes do not extend at right angles to the bars) so as to close communication between the two sides of each bore except through the circular passages 58.

Cooling fluid, such as water, is admitted to one side of each bore as through fittings 65 and 67, and is discharged through fittings 66 and 68. The two fittings 66 and 68 which are disposed below the respective bars 1 and 2 communicate with the respective bores through a passageway shown for example at 69 in Fig. 6. Separate hose lines may lead from each fitting 65, 66, etc., to a cooling system, and water may be pumped through such hose lines; for instance, through the fitting 65, along the one side of the bore 55, around the electrode 3, and thence back on the opposite side of the bore 55 to the communicating passage of the fitting 66, the hose line of which may return the water directly to the cooling system.

Placement of the flat partition strips 60 snugly in the bores 55, and with their principal planes parallel to the working plane of the bars 1 and 2 tends to stiffen the bars against bending in such working plane in the event of application of excessive force on the toggle mechanism.

I claim:

1. A portable spot-welding machine, comprising two conductor bar members, each having a welding electrode projecting therefrom, one toward the other, a pivotal connection between the members, mechanism disposed beyond the pivot in a direction away from the electrodes for moving the members about the pivot to bring the electrodes into contact with the work, said mechanism and the pivotal connection being relatively movable along the bar members from one operating position to another to vary the operating force of the mechanism, and means carried by the movable pivotal connection for receiving a supply cable for each of the conductor members.

2. In a portable electric welding machine, two conductor members, each having an electrode portion and a longitudinally extending bore therein for cooling the electrode, said members being pivotally connected by brackets which are slidable thereon and adapted to be secured in a plurality of positions along the members to change the location of the pivot axis, means carried by the slidable pivotal connection for receiving a supply cable for each of the conductor members and mechanism, including a set of toggle links and an operating handle on one of the links, in spaced relation to the brackets, for moving the electrodes into and out of contact with the work.

3. In a portable electric welder, a frame having a pair of hollow extending conductor arms provided with means for cooling the same, a pair of pivotally connected brackets slidably mounted on the arms, each of which is recessed on one side to receive and embrace an arm, terminals carried by the slidable brackets to receive a supply cable for the conductor arms, plates adapted to be secured to the brackets opposite the recess for clamping the arms in place, one of said plates being provided with a supporting handle which is adapted to be secured to its bracket in a plurality of different turned positions.

4. In a portable electric welder, a frame having hollow extending conductor arms provided with means for cooling the same, brackets which are pivoted together in a manner to connect the arms slidably mounted thereon, each being recessed on one side to receive one of the arms, terminals carried by the slidable brackets to receive a supply cable for the conductor arms, plates adapted to be secured to the brackets opposite respective recesses for clamping the arms in place, one of said plates having a supporting handle extension, and the plates being interchangeable in position on the brackets.

5. In a portable electric welding machine, a pair of hollow extending conductor members provided with means for cooling the same, each of uniform section for a considerable portion of its length and each having a welding electrode, pivotally interconnected brackets arranged to attach the members to each other, said brackets being adapted to be slidable thereon and secured in different positions along the uniform section portions of the members, means carried by the slidable brackets to receive a supply cable for the conductor members, a supporting handle secured to one of the brackets, and means including another handle operatively connected with both members for moving the electrode tips into and out of contact with the work.

6. In a portable electric welder, a frame having welding arms, each having a welding electrode and a longitudinally extending bore therein for cooling the electrode, a pivotal connection for the arms slidably mounted thereon means carried by the slidable connection to receive a supply cable for the welding arms an operating connection for the arms including a pair of toggle links, one of which has a handle extending therefrom beyond the mutual pivot of the links, said toggle being reversible in position to alter the region of operation of the handle, and supporting means carried by the pivotal connection which is positionable on the arm to permit the operation of the handle in its reversed position.

7. In a portable electric welding machine, two conductor members each having an electrode and having slidable portions thereon pivotally connected by a pin to enable movement of the members in the manner of a pair of tongs, means connected with the conductor members for effecting such movement of the members in a manner to bring the electrodes into and out of contact with the work, means carried by the slidable portions by which current may be supplied to the respective conductor members, and electrical insulation means including a sleeve surrounding the pivot pin and seated in one of the aforesaid portions of said members.

8. In a portable electric welder, a frame having metallic welding arms, each provided with an electrode, a pivotal connection for the arms slidably mounted thereon, means carried by the pivotal connection for connecting a supply cable to each of the arms, an operating connection between the arms including a pair of toggle links and means connected therewith to render the links effective to move the arms, a pin for pivotally securing one of the links to one of the arms, and an electrically insulating sleeve surrounding the pin and operatively supported by the latter arm.

9. In a welding machine, having conductor members a pivotal connection slidable on the members, each member having a transverse opening in it, an electrode seat in said opening, and having a welding tip at one end projecting laterally from the member, a longitudinal internal passage in the member having a portion passing around the electrode, and means longitudinally dividing the passage and extending to the electrode whereby cooling fluid may be introduced through one side of the passage to cool the member and electrode and removed from the other side of the passage.

10. In a portable electric welding machine for spot-welding, a conductor member having a longitudinal bore and a transverse bore communicating therewith, an electrode tip secured in the transverse bore, said member having a passage extending around the electrode tip and communicating with opposite sides of the bore, a partition strip in said bore having one end in the central plane of the electrode and closely adjacent thereto, and means by which cooling fluid may be introduced into the longitudinal bore at one side of said partition remote from the electrode and removed from the bore at the other side.

11. In an electric welding machine for spot-welding, a conductor bar having substantially the same cross-section for a considerable portion of its length and having a bore extending lengthwise of it, an electrode carried by the bar at one end of the bore, means pivotally attached to the bar, the means and bar being relatively movable in a fixed working plane, said means having an electrode positioned to cooperate with the electrode of the bar, and a flat dividing strip for the bore to provide two conduit passages for cooling fluid therein, the principal plane of the strip being parallel to the aforesaid working plane so that the bar is reinforced by the strip against bending in said plane.

MERIL L. ECKMAN.